June 27, 1933.　　　E. L. TRUBA ET AL　　　1,915,631
ELECTROMAGNET PAINT STRIPING TEMPLATE
Filed July 31, 1929　　　3 Sheets-Sheet 1

JOINT INVENTORS
Edward L Truba
Roy K Truba
BY Myron J Dikeman
ATTORNEY.

June 27, 1933.  E. L. TRUBA ET AL  1,915,631
ELECTROMAGNET PAINT STRIPING TEMPLATE
Filed July 31, 1929     3 Sheets-Sheet 2
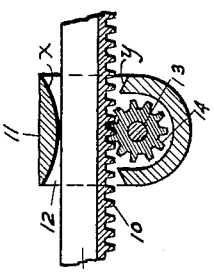
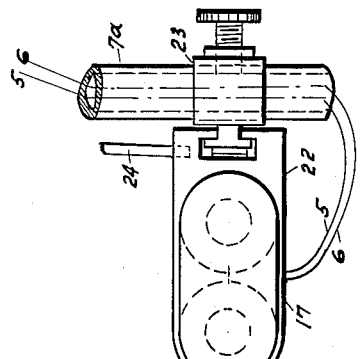
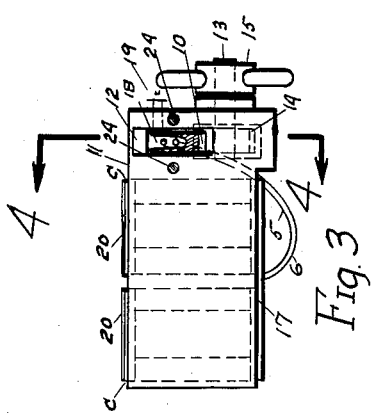
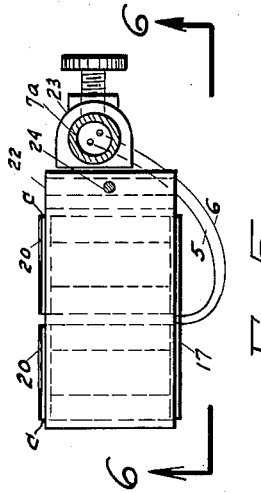
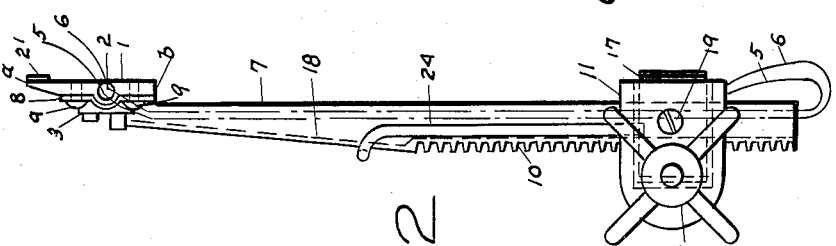
JOINT INVENTORS
Edward L Truba
Roy K Truba
BY Myron J Dikeman
ATTORNEY.

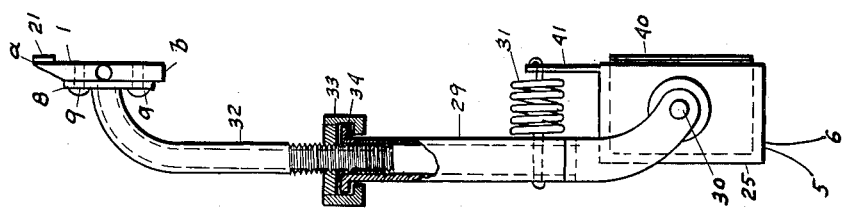
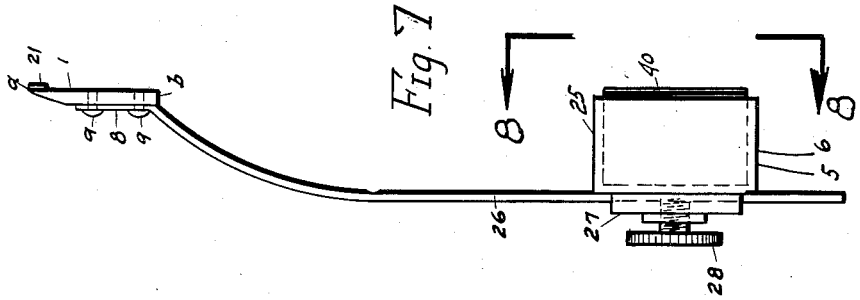
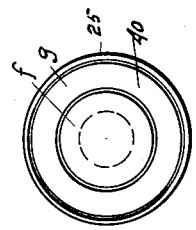
JOINT INVENTORS
Edward L. Truba
Roy K. Truba
BY Myron J. Dikeman
ATTORNEY.

Patented June 27, 1933

1,915,631

UNITED STATES PATENT OFFICE

EDWARD L. TRUBA AND ROY K. TRUBA, OF DETROIT, MICHIGAN, ASSIGNORS OF ONE-THIRD TO DEAN O. TRUBA, OF DETROIT, MICHIGAN

ELECTROMAGNET PAINT STRIPING TEMPLATE

Application filed July 31, 1929. Serial No. 382,508.

This invention relates to a paint striping template provided with electro-magnetic attaching means, and is especially adapted for striping newly painted auto bodies and without marring the paint.

The object of our invention is to provide an adjustable striping template that can be readily mounted on the side wall of a newly painted metal auto body and securely retained thereon in any chosen position without applying any exterior clamping means thereto.

Another object is to produce a striping template that can be easily and quickly attached to any metal wall surface by electro-magnetic means and thereafter adjusted to other positions without detaching the supporting magnets.

These several objects are attained in the preferred form by the construction and arrangement of parts more fully hereinafter set forth.

Similar parts on all drawings are marked by similar numerals or letters.

Fig. 2 is an end view of the assembled device showing the relative position of the supporting members attached to the template.

Fig. 3 is a sectional view taken on the line 3—3 of Fig. 1 showing the electro-magnet unit mounted in the supporting casing.

Fig. 4 is a sectional view taken on the line 4—4 of Fig. 3 showing the rack and gear adjusting mechanism.

Fig. 5 illustrates an alternate form of electro-magnet unit provided with adjustable support member pivoted thereto, with the rack and gear adjusting means omitted.

Fig. 6 is an end view of the unit shown in Fig. 5 taken on line 5—5 of said figure showing the slotted adjusting means for the support member mounted thereon.

Fig. 7 illustrates an end view of an assembled modified form of supporting means formed with a single electro-magnet and slidably mounted spring support member.

Fig. 8 is a front view of the electro-magnet taken along the line 8—8 of Fig. 7 showing the general arrangement of the magnet poles for the single magnet.

Fig. 9 shows a further modified form of the supporting means, provided with screw adjustment for varying the template positions after the electro-magnets have been attached.

Figure 1:
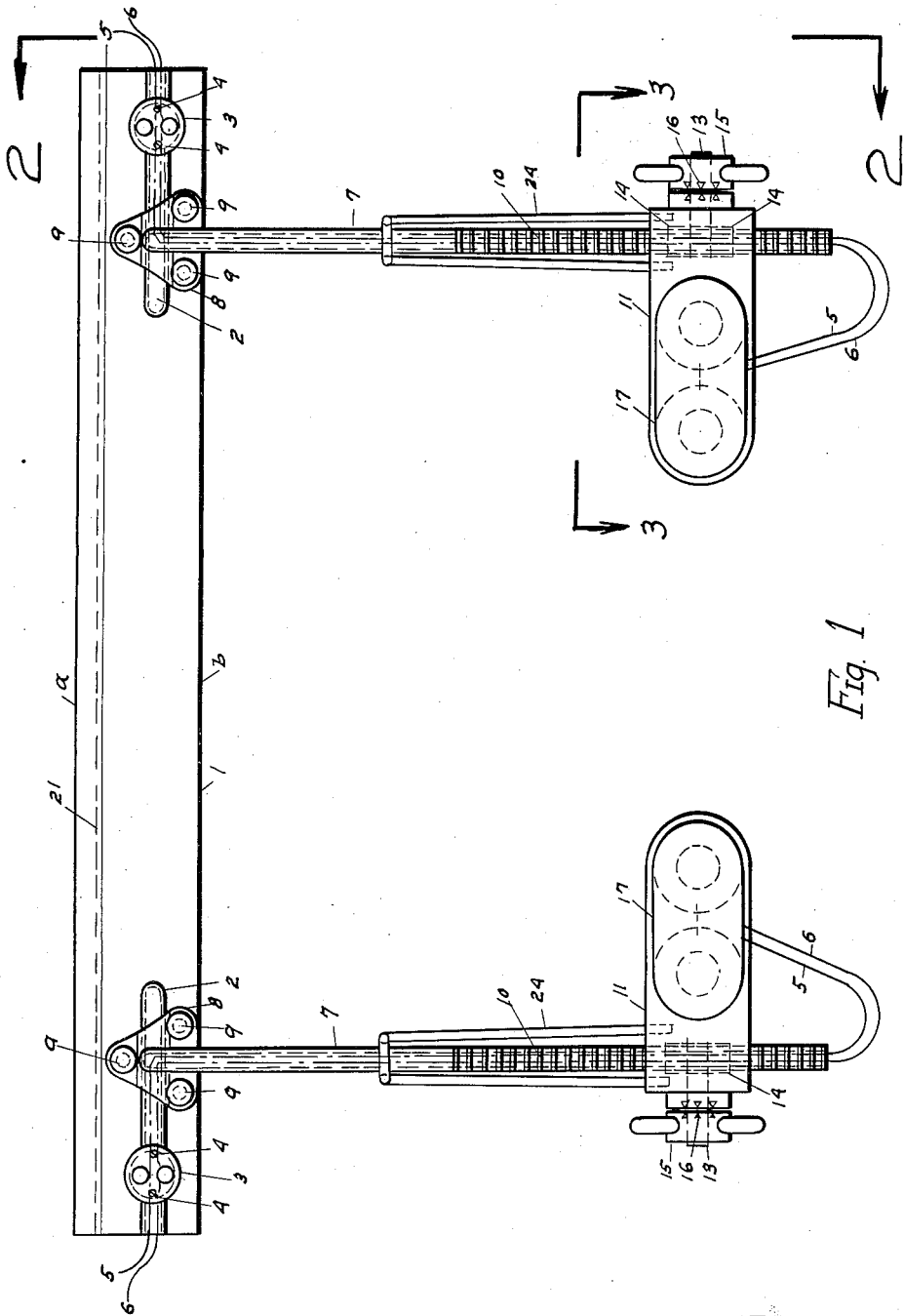
Fig. 1 is a front view of our device showing the relative position of the template and the supporting means.

In general this invention comprises a template form, preferably made of thin, flexible material, designed to fit against a flat metal wall surface, and especially adapted for use on metal auto bodies, the template edges being formed to the lines desired to be traced on the auto body for striping the painted surfaces to various chosen designs. Fixedly attached to the outer face of the template are rigid supporting arms, each of which is provided with an adjustable electro-magnet having means for connecting same within a proper electric circuit, the magnets providing means for securely holding the template firmly in place on the metal auto body wall until the electric circuit through the magnets are opened by suitable operating switches placed therein.

While this invention is illustrated with a flat, straight edge template, it is to be understood that a curved template, or a template with curved edges may be used equally as well, or any combination of straight or curved walls. The actual design of the template walls is not material to the invention, and the curved as well as the straight are included in this patent.

The template sheet —1— is preferably made of thin sheet metal of light weight, such as aluminum, or of any other suitable material that may be readily curved and adjusted to the auto body wall, and may be formed as a flat sheet as shown in the drawings, with straight edges, or curved to other designs as desired for striping lines to be traced therefrom, the template edges —a— and —b— being used as a guide for the striping brush of a paint gun. Recess grooves —2— are formed along the template near each end, of sufficient dimension for inserting electric wires therein. An electric switch —3— is fixedly mounted on the template face near the ends thereof and intercepting the grooves —2—, and securely attached to the template by the screws —4—. Electric circuit wires —5— and —6— are mounted therein and connected within an electric circuit and controlled by the switches —3—, preferably separate electric circuits for each switch. Mounted on the outer face of template —1— also intercepting the grooved recesses —2— are hollow support arms —7—. The support arms being formed with end flanges —8— are securely attached to said template by the rivets —9—, said arms being positioned in a plane approximately parallel to the template surface. Along one edge of each of the arms —7— is formed a gear rack —10—. Slidably mounted on each support arm —7— is an adjustable magnet casing —11—, formed with a rack recess —12— passing therethrough, capable of receiving and sliding over the toothed section of the arm, said recess preferably being formed with curved edge walls —x— and —y— to allow for a slight adjustment of the arm therein. The magnet casings are positioned approximately at right angles to the supporting arms —7— and in a plane therewith. Within each of the casings —11— is mounted a gear shaft —13—, positioned opposite the gear rack —10—. A small pinion gear —14— is mounted on the inner ends of the shafts —13— positioned to mesh with the teeth of said gear rack. An operating wheel —15— is fixedly mounted on the outer end of the gear shaft providing means for turning said pinion gear and to adjust the arms to various positions within the casings —11—. Indicator points —16— are formed on the adjacent hub surfaces to designate the adjustment made as the operating wheel is turned. Any other means for regulating the movements of the gear for pre-determined distances will do as well. A tension spring —24— is fixedly mounted in the casing —11— and projected along the adjacent supporting arms —7—, engaging therewith in a manner for causing the supported template —1— to be pressed tightly against the metal auto body wall when the template is attached thereto. Within each of the casings —11— is mounted a small electro-magnet —17—, positioned with the faces —c— of the magnet poles approximately in the same plane of the inside template surface. The electro-magnets —17— may be of the double type as illustrated in Figs. 1, 3, 5 and 6, or they may be of the single type magnet as illustrated in Figs. 7, 8 and 9 of the drawings. The type or design of the magnet is not material, providing it has sufficient strength for retaining the template on the metal wall to which it is applied. The electric circuit wires —5— and —6— are extended through their respective switches —3— and through the hollow support arms as illustrated in the drawings Fig. 1, and connected to the electro-magnets —17—, either in separate circuits as shown, or in a single electric circuit if desired. The circuit wires —5— and —6— being extended below the arm ends sufficiently to allow for adjustment of the arms through the suporting casings —11—. The wires —5— and —6— may be connected directly to the magnets without passing through the template, if desired. A set screw —19— is mounted in the ends of casings —11—, positioned to engage the supporting arms —7— and retain them in any position after adjustment has been made. Any other means for locking the arms rigidly within the casing recesses will do as well. Soft pliable pads —20— of suitable material are mounted on the faces —c— of the magnet poles to prevent the magnets from marring the newly painted surfaces to which the magnets may be applied when the template is attached for stripe painting. Also, if desired a like pad —21— may be attached to the template edge, also for preventing marring of the painted surfaces by metallic contact therewith.

When the circuit wires —5— and —6— are connected within a proper electric circuit, and the assembled device pressed flat against a painted metal auto body wall, and placed in the desired position, the magnets —17— also being in contact therewith, and the electric circuit closed through the switches —3—, magnetic forces will be set up within the electromagnets sufficiently for seizing the metal wall plate and securely holding the template in place, and the slight adjustment necessary may be readily made by the gear and rack means, the template being retained in that position as long as the electric current is allowed to pass through the magnets, and providing a guide for the striping brush or paint gun as may be used in striping the painted body. The whole device being instantly removed by opening the electric switches —3—.

Figs. 5 and 6 illustrate a modified form of magnet casing —22—, and is provided with an adjustable arm support member —23— pivotally attached thereto. The support arm —7a— being adjustable within the pivoted member —23— and is subjected to the action of the tension spring —24— the same as in the former case, the arm adjustment being made at the pivoted joint, instead of the slotted recess walls —x— and —y— as formerly described.

Figs. 7 and 8 illustrate an end view of an assembled alternate arrangement of the supporting arm members, using a single unit magnet —25— and a spring arm support —26— fixedly attached to the template —1— and slidably mounted within a bracket recess —27— positioned along the outer magnet wall. The spring supporting arm being adjusted as desired and secured by the thumb screw —28— mounted within the bracket wall. The single unit magnet is provided with the ordinary electric circuit wires —5— and —6— the same as in the former case. The device being operated the same as heretofore described. Fig. 8 illustrating the general arrangement of the magnet poles, one being inserted within the other, and both of the pole surfaces (—f— and) —g— covered with a suitable protecting pad —40— to prevent marring of any painted surface to which it may be applied.

Fig. 9 illustrates a further modification of the support members, and is shown also with the single magnet unit —25— having a tubular forked support —29— pivoted thereto by the pivot pins —30—. The support arm —29— is under the influence of the tension coil spring —31— as attached thereto and to the magnet support arm —41—. A threaded adjusting tube —32— is slidably mounted within the open end of the tubular support arm —29—, and retained therein by a threaded adjusting nut —33— screwed thereon and rotatably mounted on the end of the tubular support arm —29— by the ring collar —34—. The magnet —25— is provided with the ordinary electric circuit wires —5— and —6— and the template is operated exactly as heretofore described.

Having fully described our electro-magnet paint striping template, what we claim as our invention and desire to secure by Letters Patents:

1. An electro-magnet template adapted for striping painted metal surfaces comprising a flexible template sheet formed to some pre-determined design, support members securely attached to said template sheet, electro-magnets mounted on said support members, means provided for adjusting the position of the electro-magnets on the support members, electric circuit wires containing an electric switch connected with each of the electro-magnets, and spring means extended between the electro-magnet supports for engaging the template support members for holding said template sheet firmly against the painted metal surface when the electro-magnets are attached thereto by forces resulting from the electric current therein.

2. An electro-magnet template adapted for attaching magnetically to metal walls for striping painted surfaces thereon, comprising a template sheet formed to some pre-determined design, support members mounted on the template sheet, adjustable support frames mounted on said support members, an electro-magnet mounted within each of the support frames and positioned with the magnet pole contact surfaces in the same plane with the contact surface of the template sheet, means mounted in the support frame for causing adjustment thereof on the support member, spring means connected between the electro-magnet frames and the support members stressed to cause a lateral movement of the support members with the attached electro-magnets, and circuit wires with electric switch installed connected with the electro-magnets for connecting same into an electric circuit.

3. An electro-magnet adapted for attaching magnetically to metal walls for striping painted surfaces, comprising a template sheet formed to some desired design, support members fixedly attached thereto, adjustable support frames mounted on said support members, geared means formed between said frames and support members for adjusting the position of said support frames thereon, locking means mounted within said support frames for engaging and locking to the support members, electro-magnets mounted within each of said support frames positioned with the magnet pole contact surfaces in approximately the same plane with the template contact surface, spring means mounted between the adjustable support frames and the support members, stressed to cause a lateral movement therebetween, electric circuit wires connected with each of the electro-magnets for placing them within an electric circuit, and an electric switch mounted with one of said electric circuit wires.

4. An electro-magnet adapted for attaching to metal walls for striping painted surfaces thereon, comprising a flexible template form cut to some desired design, suitable support arms fixedly attached to said template form and positioned parallel therewith, electro-magnets mounted on each of said support arms positioned with the magnet pole contact surfaces approximately parallel with the template contact surface, said support arms being provided with means for adjusting the positions of the attached electro-magnets, spring means provided for causing a lateral movement of the support arms in the magnet mountings, electric circuit wires connected to each of the electro-magnets, and an electric switch connected within one of the circuit wires.

5. An electro-magnet adapted for attaching to metal walls for striping painted metal surfaces, comprising a flexible template sheet formed to some pre-determined design, support arms having gear rack edges securely mounted on said template sheet, support frames slidably mounted on said support arms, operating gears rotatably mounted within said support frames positioned to mesh with the gear rack edges of the support arms, means mounted thereon for rotating said gear and adjust the support frames along the support arms, spring means attached between the supporting frame and the supporting arm for causing a lateral movement thereon in the frame mounting, electro-magnets mounted within the said support frames positioned with the magnet pole contact surfaces parallel to the contact surface of the template, and electric circuit wires containing an electric switch electrically connected with the electro-magnets.

In witness whereof we sign these specifications.

EDWARD L. TRUBA.
ROY K. TRUBA.